(No Model.) 2 Sheets—Sheet 1.
H. L. HARTENSTEIN.
PROCESS OF UTILIZING WASTE PRODUCTS OF BLAST FURNACES.
No. 596,705. Patented Jan. 4, 1898.
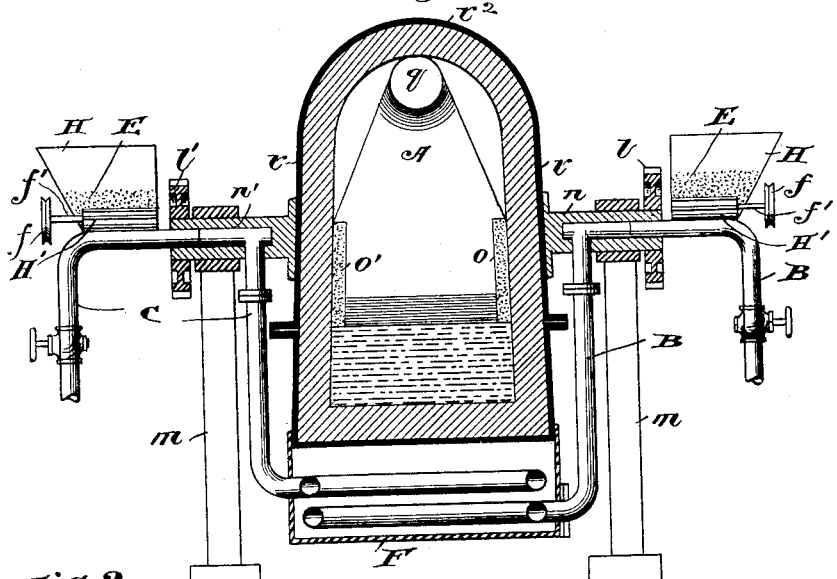
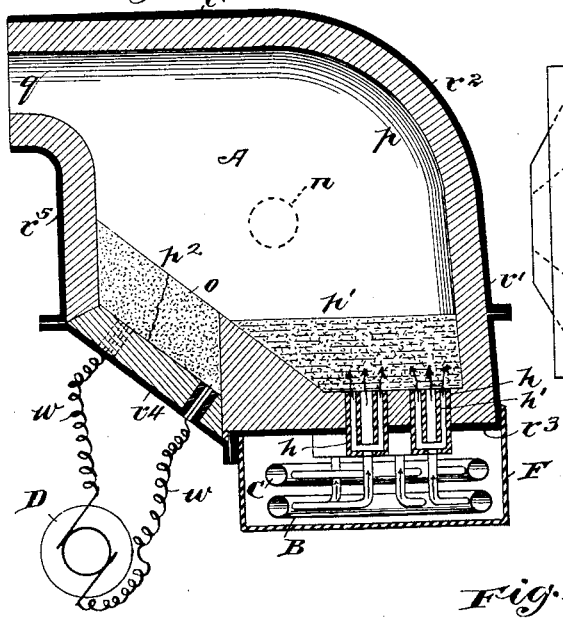
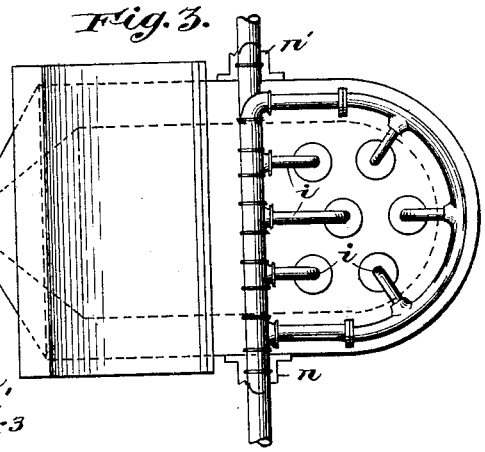
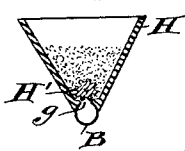

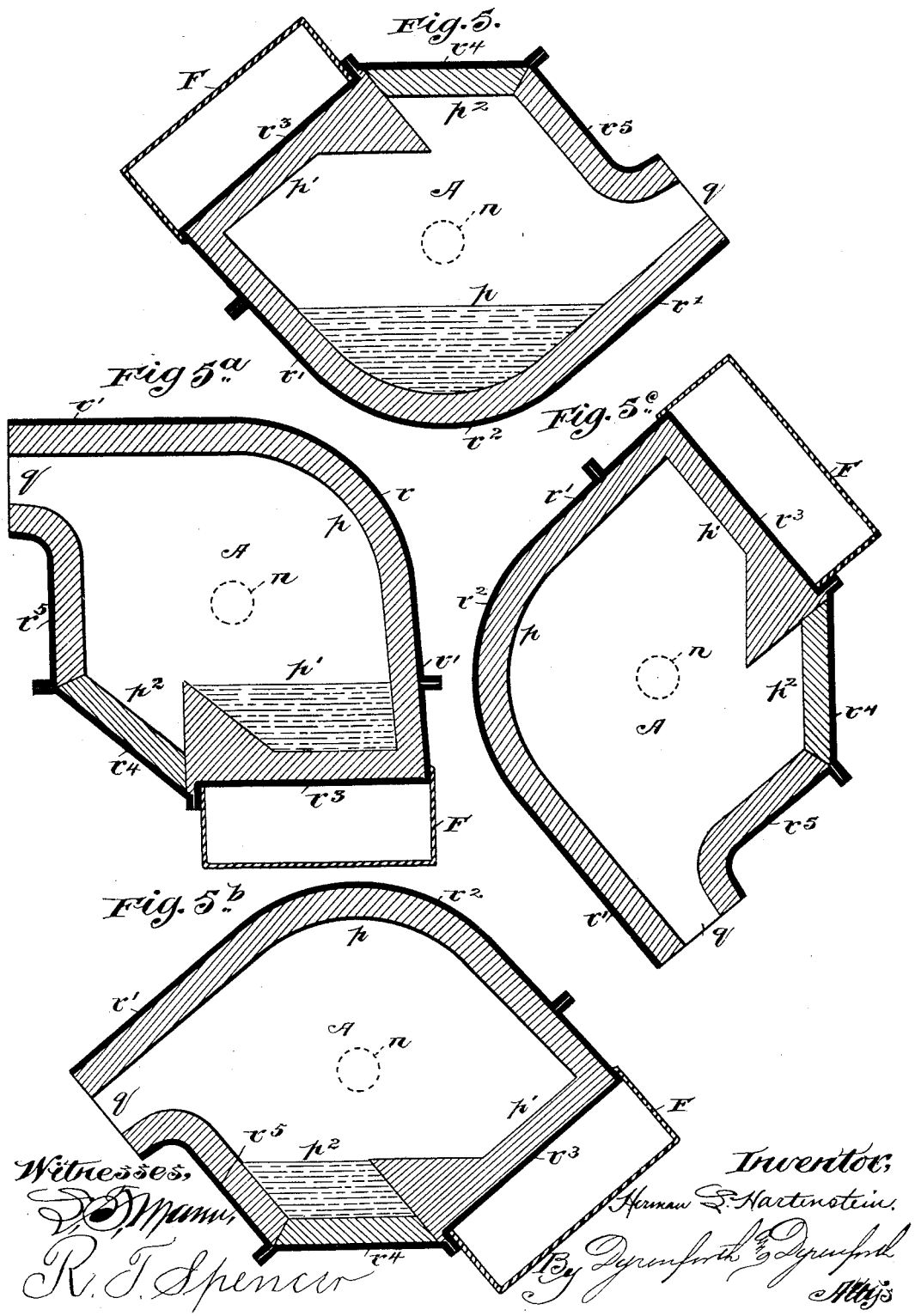

UNITED STATES PATENT OFFICE.

HERMAN L. HARTENSTEIN, OF BELLAIRE, OHIO.

PROCESS OF UTILIZING WASTE PRODUCTS OF BLAST-FURNACES.

SPECIFICATION forming part of Letters Patent No. 596,705, dated January 4, 1898.

Original application filed October 27, 1896, Serial No. 610,245. Divided and this application filed February 9, 1897. Serial No. 622,651. (No specimens.)

*To all whom it may concern:*

Be it known that I, HERMAN L. HARTENSTEIN, a citizen of the United States, residing at Bellaire, in the county of Belmont and State of Ohio, have invented a new and useful Improvement in Processes of Utilizing the Waste Products of a Blast-Furnace, of which the following is a specification.

The subject of this application is divided out of my application, Serial No. 610,245, filed October 27, 1896.

The object of my invention is so to dispose of blast-furnace slag as to produce therefrom a valuable commercial material useful for the manufacture of acetylene and other high-grade hydrocarbon gases and for various chemical and manufacturing processes, and incidentally to solve the problem of ridding blast-furnace plants of the ever-increasing incubus of slag and reduce the cost of manufacturing iron and steel.

To this end my invention consists in reducing the solidified slag to a molten condition and either before or after melting it mixing therewith a suitable proportion of carbonaceous material, and finally subjecting the molten slag, with its admixture of carbonaceous material, to the action of an electric current by including it in the circuit thereof.

My process also involves the use, by preference, of a reducing-gas, and if the melting of the slag be done before mixing therewith the carbonaceous material I employ the gas under pressure as the vehicle for forcing the carbonaceous material into the molten slag.

An average sample of blast-furnace slag produced in the manufacture of Bessemer iron shows its composition to be about as follows: lime, fifty to fifty-five per cent.; silica, twenty-five to twenty-eight per cent.; alumina, sixteen to eighteen per cent., and a small proportion of other elements, varying according to the ore and limestone used in the furnace. By my treatment of the slag the oxygen is expelled from it and the calcium, silicon, and aluminium are combined with the carbon.

Referring to the accompanying drawings, Figure 1 is a view in cross-sectional elevation, partly broken, of an apparatus suitable for use in practicing my invention; Fig. 2, a view of the same in sectional side elevation; Fig. 3, a bottom plan view of the converter with the pipe-inclosing box removed; Fig. 4, a cross-sectional view of a coke-feeding detail; and Figs. 5, $5^a$, $5^b$, and $5^c$ are sectional views of the converter-chamber, showing it in the different positions to which it is adjusted in use.

The apparatus referred to is more especially adapted for the treatment of the slag by mixing with it the carbonaceous material and fusing the mixture by electricity after the solid slag has been reduced to a molten condition. Hence the description of my process, hereinafter contained, is confined to that phase thereof in explaining it with relation to the aforesaid apparatus.

A is a converter-chamber formed with the straight side walls $r$ and end walls $r'$, the latter flaring from a rounded base $r^2$, which connects them, the walls $r'$ being connected from their outer ends by a top formed of three sections $r^3$, $r^4$, and $r^5$ in angular relation to each other, and between the top section $r^5$ and the end wall $r'$ the spout-opening $q$ is formed. The shell of the converter-chamber may be formed of metal lined with refractory material, as indicated, the refractory lining, which I prefer to form of fire-clay, affording both a heat and an electric insulator. For convenience of access to the interior of the chamber A, as for repairing linings, renewing the carbon slabs hereinafter described, and the like, the wall-sections $r^3$ and $r^4$ should be removable and fastened together and to the respectively adjacent parts of the shell by bolts and keys or other means that will permit expeditious separation of the removable wall-sections.

The terms "base" and "top," above employed, are applied to the relative parts of the converter-chamber in the position in which it is shown in Fig. 5, being its initial position or that in which it receives the charge.

The inner construction of the chamber A forms therein the three compartments $p$, $p'$, and $p^2$, the first-named being the slag-receiving compartment, the second the mixing-compartment, and the third the electric-treatment compartment. The compartment $p^2$ contains electrodes $o$ and $o'$, preferably in the form of carbon slabs, which are let into grooves (not shown) in the lining of the compartment, through the base of which are connected with the respective electrodes the insulated terminal wires $w$ and $w'$, (see Fig. 2,) leading from the poles of a suitable electric generator D, say a dynamo-electric machine.

The converter-chamber A is supported on hollow trunnions $n$ and $n'$, respectively, extending from its opposite sides through bearings at the upper ends of suitable standards $m$ and $m'$, and the trunnions carry near their outer ends the cog-wheels $l$ and $l'$, Fig. 1, to be engaged by suitable rack mechanism (not shown, but such as is commonly used in steel-mills) for turning the chamber on its trunnions, as hereinafter described.

The base of the mixing-compartment $p'$ is pierced by feed-tubes $h$, of refractory material, such as fire-clay, each of which contains a pair of diaphragms $h'$ $h'$, of the same material as the feed-tubes, reaching short of the base to subdivide the tube into a number of passages for the better distribution of the material which is blown through them, as hereinafter described. These tubes thus form twyers.

B and C are pipes, the one leading from a supply (not shown) of gas under pressure and the other from the same source or from an air-blower (not shown) through the trunnions $n$ and $n'$, in which the pipes are divided, as indicated in Fig. 1, to permit turning with the converter-chamber the depending sections of the pipes, which are connected by branches $i$ with the twyers. A removable box F covers the base of the section $r^3$ to protect the pipes and twyers from injury.

In the horizontal stationary portion of each pipe it is slotted longitudinally, the slot $g$ (shown in Fig. 4) being inclosed by a hopper H, rising from the pipe and containing a rotary fluted cylinder H', journaled in the base portion of the hopper to extend lengthwise of and cover the slot $g$, and provided on the outer end of its stem $f'$ with a pulley $f$, through the medium of which to drive the fluted cylinder and cause it to feed with regularity into the pipe through its slot the pulverized carbonaceous material (coke) E, contained in the hopper. The cylinders H' so closely cover the respective slots in the pipes as to prevent escape of gas from the latter.

Preparatory to using the apparatus thus described in practicing my process I melt a quantity of slag in a suitable receptacle, such as an ordinary cupola; and the apparatus is prepared for the treatment by heating the converter-chamber by admitting gas into it on opening the valve in the gas-pipe and igniting the gas, as by means of a handful of burning wood or shavings thrown into the chamber. When the chamber has been sufficiently heated, the gas is turned off and the chamber is brought to the position in which it is shown in Fig. 5, in which the molten slag is poured from the receptacle containing it into the compartment $p$ of the converter-chamber through its opening $q$. The gas is then slowly turned on and the coke-feeding mechanism is started and is continued in operation under the full pressure of the gas-supply until a sufficient quantity of the carbonaceous material—say about one part of coke to three parts of slag—has been fed, the feeding operation requiring not more than, say, about five minutes, during which the chamber A is slowly turned on its trunnions from the position in which it is represented in Fig. 5 to that in which it is represented in Fig. $5^a$ and back again. In this manner the charge of molten slag is caused to flow into the mixing-chamber $p'$ and becomes thoroughly impregnated throughout its entire mass with innumerable particles of the coke. It may be determined by spectroscopic observation of the carbon-lines of the converter-flame when the mixing has proceeded far enough.

It should be stated that the only use for an air-blast, hereinbefore referred to, is when or if the supply of gas shall be defective, in which event the air may be used in conjunction with the pulverized coke for promoting combustion of the latter to maintain the molten condition of the slag or to restore lost heat. The gas employed may be that evolved from the materials treated in the converter and should, to enable it to be used, be accumulated and stored in a suitable holder.

On completing the mixing with the molten slag of the carbonaceous material the electric current is turned on, the gas-pressure is turned off, and the converter-chamber is swung to the position in which it is represented in Fig. $5^b$, whereby the material is run into the compartment $p^2$.

The composition of blast-furnace slag renders it highly resistant to electricity; but by mixing with it the carbonaceous material, which is a good conductor of electricity, and interposing in the circuit the mass of the mixture the latter is rendered conductive, but presents to the passage of the current the resistant property of the slag between adjacent particles of the coke contained therein, whereby innumerable arcs are formed throughout the mass for generating the great intensity of heat requisite for the conversion of the mixture into the product of my improved process. Thus the medium (carbonaceous material) of conversion also affords the medium for the transmission of the current through the mass to be converted to generate the necessary intensity of heat to effect the conversion.

It takes about twenty minutes to thoroughly carburet the slag, after which the current is turned off and the chamber A is swung to the position in which it is represented in Fig. $5^c$ to discharge the molten product, which may be cast into ingots or in molds of any desired size and shape. The converter is then ready to be used over again by returning it to its initial position, in which it is represented in Fig. 5, to receive another charge of molten slag.

What I claim as new, and desire to secure by Letters Patent, is—

1. The process of utilizing the waste product of a blast-furnace, which consists in melting solidified slag and mixing therewith a suitable proportion of carbonaceous material and subjecting the molten slag with its admixture to the action of an electric current by including it in the circuit thereof, substantially as described.

2. The process of utilizing the waste product of a blast-furnace, which consists in melting solidified slag, then blowing into and thereby impregnating the molten slag with pulverulent carbonaceous material in suitable proportion and subjecting the molten slag with its admixture to the action of an electric current by including it in the circuit thereof, substantially as described.

3. The process of utilizing the waste product of a blast-furnace, which consists in melting solidified slag, mixing with the molten slag a suitable proportion of carbonaceous material, agitating the mixture to enhance the impregnation of the slag with said carbonaceous material and subjecting the mixture to the action of an electric current by including it in the circuit thereof, substantially as described.

4. The process of utilizing the waste product of a blast-furnace which consists in melting solidified slag, forcing with gas-pressure into the molten slag a suitable proportion of pulverulent carbonaceous material, and subjecting the molten slag with its admixture to the action of an electric current by including it in the circuit thereof, substantially as described.

5. The process of utilizing the waste product of a blast-furnace, which consists in melting solidified slag, forcing with gas-pressure into the molten slag a suitable proportion of pulverulent carbonaceous material, agitating the mixture to enhance the impregnation of the slag with said carbonaceous material and subjecting the molten slag with its admixture to the action of an electric current by including it in the circuit thereof, substantially as described.

HERMAN L. HARTENSTEIN.

In presence of—
 M. S. MACKENZIE,
 R. T. SPENCER.